(12) United States Patent
Sarholz et al.

(10) Patent No.: US 6,820,461 B2
(45) Date of Patent: Nov. 23, 2004

(54) METHOD FOR DETERMINING NOX MASS FLOW FROM CHARACTERISTICS MAP DATA WITH A VARIABLE AIR INLET AND ENGINE TEMPERATURE

(75) Inventors: Walter Sarholz, Stuttgart (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/363,652

(22) PCT Filed: Aug. 24, 2001

(86) PCT No.: PCT/DE01/03250
§ 371 (c)(1),
(2), (4) Date: Mar. 4, 2003

(87) PCT Pub. No.: WO02/20967
PCT Pub. Date: Mar. 14, 2002

(65) Prior Publication Data
US 2003/0159521 A1 Aug. 28, 2003

(30) Foreign Application Priority Data
Sep. 4, 2000 (DE) .......................................... 100 43 690

(51) Int. Cl.⁷ ............................................. G01M 15/00
(52) U.S. Cl. ..................................... 73/23.31; 73/118.1
(58) Field of Search ............................. 73/23.31, 23.32, 73/116, 117.2, 117.3, 118.1, 118.2

(56) References Cited

U.S. PATENT DOCUMENTS

| | | | |
|---|---|---|---|
| 4,291,659 A | | 9/1981 | Suzuki et al. |
| 5,327,872 A | | 7/1994 | Morikawa |
| 5,433,105 A | * | 7/1995 | Takahashi et al. .......... 73/61.46 |
| 6,233,917 B1 | * | 5/2001 | Bahr et al. ............... 60/39.093 |
| 6,512,983 B1 | | 1/2003 | Bauer et al. |
| 2002/0152009 A1 | * | 10/2002 | Bartoli ........................ 701/29 |

FOREIGN PATENT DOCUMENTS

| | | |
|---|---|---|
| DE | 196 07 151 | 7/1997 |
| DE | 197 39 848 | 3/1999 |
| DE | 198 51 319 | 5/2000 |

* cited by examiner

Primary Examiner—Eric S. McCall
(74) Attorney, Agent, or Firm—Walter Ottesen

(57) ABSTRACT

A method for determining the NOx mass flow at the input of an NOx storage catalytic converter in the exhaust gas of an internal combustion engine from operating parameters of the internal combustion engine is introduced, characterized in that the intake air temperature and the engine oil temperature are considered in the determination.

7 Claims, 4 Drawing Sheets

METHOD FOR DETERMINING NOX MASS FLOW FROM CHARACTERISTICS MAP DATA WITH A VARIABLE AIR INLET AND ENGINE TEMPERATURE

This application is the national stage of PCT/DE01/03250, filed Aug. 24, 2001, designating the United States.

BACKGROUND OF THE INVENTION

A method for engine control for gasoline-direct injection internal combustion engines having NOx-storage catalytic converters is already known from U.S. Pat. No. 6,119,449. The method provides for a modeling of the NOx-storage catalytic converter and a control (open loop and/or closed loop) of the change between storage operation and regeneration operation as well as a catalytic converter diagnosis. An essential element is the computation of the NOx raw mass flow at the input of the catalytic converter from characteristic field data via the input quantities engine rpm, relative fuel mass entry (referred to full load), exhaust-gas recirculation component and desired lambda.

The differences in the intake air temperature, for example, −20° C. in a Scandinavian winter and +40° C. in the tropical or subtropical summer and in the engine block temperature are not considered in the known computation. The engine block temperature corresponds, for example, during a cold start to the ambient temperature and can increase at full load to the regions of the maximum permissible engine oil temperature.

In a known control for gasoline-direct injection engines, a temperature (Tein) is determined from the intake air temperature and the engine temperature. This temperature is characteristic for the enclosed gas mixture at the start of the compression.

SUMMARY OF THE INVENTION

With this background, it is the task of the invention to improve the modeling of the NOx raw mass flow at the input of the catalytic converter.

This task is solved by considering the intake air temperature and the engine oil temperature when modeling.

The intake air temperature and the engine oil temperature are available in modern engine controls as measurement signals.

According to the invention, the NOx mass flow at the catalytic converter input is computed with greater accuracy than previously with the aid of these data and with an NOx emission characteristic field as a function of engine rpm, the relative fuel mass, the exhaust-gas recirculation rate and the desired lambda value. A further increase of the accuracy is made possible in an advantageous embodiment by considering the water vapor content of the intake air.

One embodiment of the invention provides that the NOx mass flow (msnovk) forward of the catalytic converter is computed as the product of a base value (msnovk0) and a temperature-dependent factor (exp (FNOXBAKT*delTemv). The base value (msnovk0) is referred to as a defined normal state.

A further embodiment provides that the temperature-dependent factor is proportional to a change (delTemv) of the combustion temperature as a consequence of changes of an inlet temperature quantity (Tein) which is combined from air temperature and engine temperature.

A further embodiment provides that the computation of the NOx mass flow ahead of the catalytic converter in an internal combustion engine takes place in stratified operation differently than in homogeneous operation. The internal combustion engine can be operated in a first operating mode with a layered mixture distribution in the combustion chamber (stratified operation) and in a second operating mode with a homogeneous mixture distribution in the combustion chamber (homogeneous operation).

According to a further embodiment, a factor for a lambda-dependent NOx formation activation is considered in the homogeneous operation.

A further embodiment provides that an increasing water vapor component of the intake air acts in the computation to reduce the NOx mass flow forward of the catalytic converter.

The invention is also directed to an electronic control arrangement which executes the above-mentioned methods.

The formulation of the present invention is so simply structured that it can be integrated into the engine control without great difficulty and without it being necessary to implement an existing NOx emission characteristic field additionally for deviating intake air and engine temperatures. Stated otherwise, a base characteristic field, which is referred to a normal state and/or exhaust-gas test conditions, can be used further. Deviations of the actual state from the normal state are considered by logically coupling the characteristic field values to corrective values, especially via a multiplicative logic coupling.

In this way, the computation of the NOx mass flow can supply the desired additional information more rapidly and with less use of storage space.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
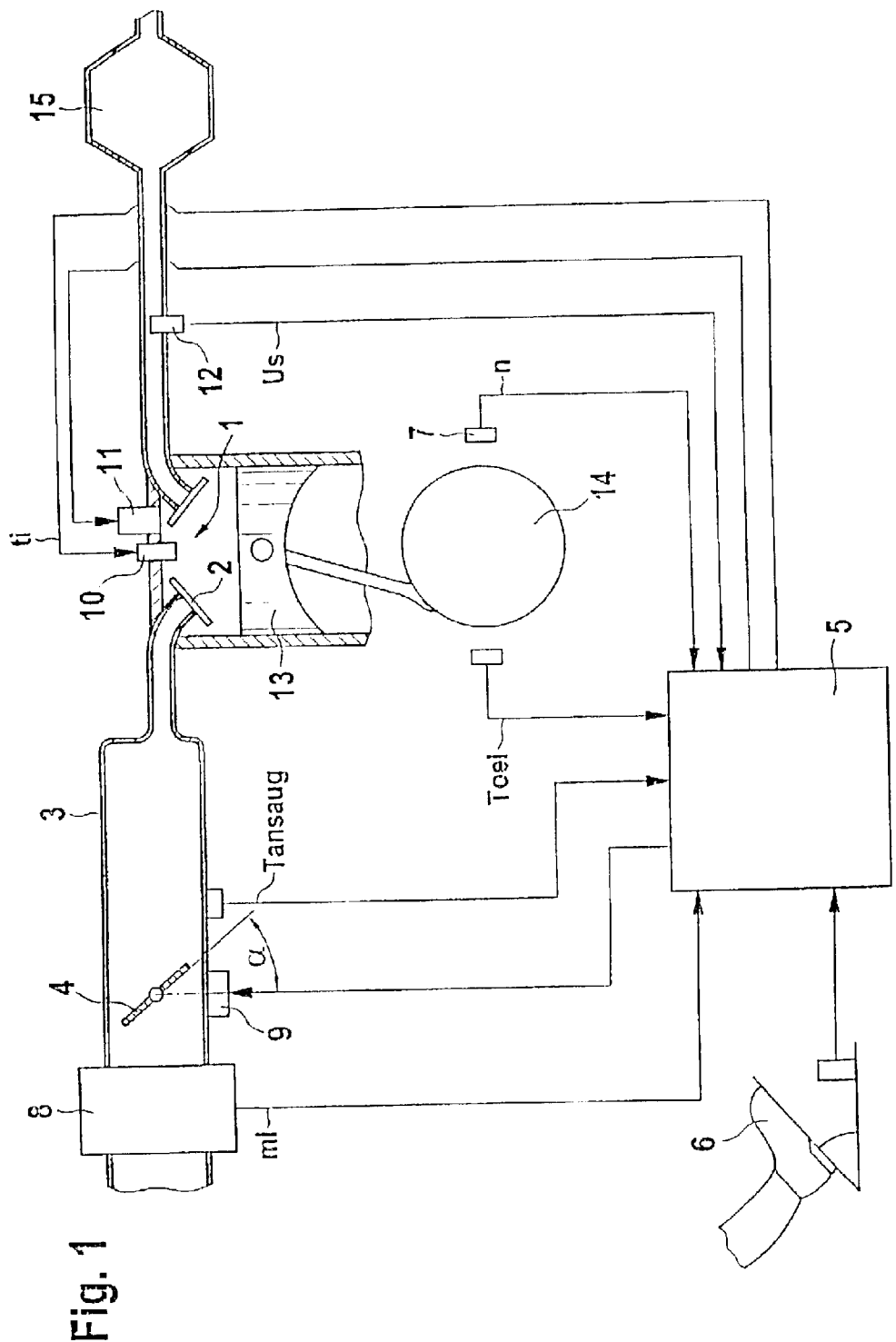
FIG. 1 shows the technical background of the invention.

In FIG. 1, 1 represents the combustion chamber of a cylinder of an internal combustion engine. The inflow of air to the combustion chamber is controlled via an inlet valve 2. The air is drawn in by suction via an intake manifold 3. The inducted air quantity can be varied via the throttle flap 4 which is driven by a control apparatus 5. The following are supplied to the control apparatus: signals as to the torque command of the driver, for example, as to the position of an accelerator pedal 6; a signal as to the engine rpm (n) from an rpm transducer 7; a signal as to the quantity ml of the inducted air by an air quantity sensor 8; and, a signal US as to the exhaust-gas composition and/or the exhaust-gas temperature from an exhaust-gas sensor 12. Exhaust-gas sensor 12 can, for example, be a lambda probe whose Nernst voltage indicates the oxygen content in the exhaust gas and whose internal resistance is applied as an index for the probe temperature, exhaust-gas temperature and/or catalytic converter temperature. The exhaust gas is conducted through at least one catalytic converter 15 wherein toxic substances are converted from the exhaust gas and/or temporarily stored.

The control apparatus 5 forms output signals from the above and, if needed, additional input signals as to additional parameters of the internal combustion engine, such as input air temperature, coolant temperature, et cetera. These output signals are for the adjustment of the throttle flap angle α via an actuating member 9 and for driving a fuel injection valve 10 via which fuel is metered into the combustion chamber of the engine. Furthermore, the triggering of the ignition via an ignition device 11 is controlled by the control apparatus.

The throttle flap angle α and the injection pulse width ti are essential actuating quantities, which are to be matched to each other, for realizing the wanted torque, the exhaust gas composition and the exhaust-gas temperature. A further essential actuating variable for influencing these quantities is the angular position of the ignition relative to the piston movement. The determination of the actuating quantities for adjusting the torque is the subject matter of U.S. Pat. No. 6,512,983 which is to this extent incorporated into the disclosure.

Furthermore, the control apparatus controls additional functions for achieving an efficient combustion of the air/fuel mixture in the combustion chamber, for example, an exhaust-gas recirculation and/or tank venting (not shown). The gas force, which results from the combustion, is converted into a torque by piston 13 and drive 14.

For modeling the NOx entry into the catalytic converter, the control apparatus computes the mass flow mNox of the nitrogen oxides to the catalytic converter for oxygen excess in the exhaust gas from operating parameters of the combustion engine. This can, for example, take place by addressing a characteristic field wherein the instantaneous NOx emissions are stored in dependence upon the operating point. Essential operating parameters in this context are the engine rpm, the relative fuel mass, the exhaust-gas recirculation rate and the desired lambda value. The total quantity of nitrogen oxide, which is emitted in the lean phase, results therefrom via integration.

Details of the modeling of the NOx mass flow, which results from the combustion, are described in U.S. Pat. No. 6,119,449 which is incorporated to this extent into the disclosure.

The additional influence quantities, which are used in the context of the present invention, are intake air temperature Tans and engine oil temperature Tmotor. These influence quantities act on the combustion temperature of the air/fuel mixture which decides as to the NOx formation in lean operation. Under these conditions, NO is formed in accordance with the Zeldovich mechanism (thermal NO). With the known activation energies of this mechanism, one can estimate that, for otherwise same conditions, the temperature-dependent exponential term of an Arrhenius equation can be linearized for usual inlet temperatures (equation 1). For considering intense effects such as, for example, at high air humidity, the use of a characteristic line on the basis of the given exponential function is recommended. With this starting point, one can adapt the influence factor FNOXBAKT for the effect of the different temperatures on the NOx mass flow to each type of vehicle. In this way, the formulation is also independent of the NOx formation mechanism and applies, for example, also to the prompt-NO, which forms (preferably enriched), for example, with significantly less activation energy than the Zeldovich-NO.

For computing the NOx mass flow forward of the catalytic converter (msnovk), the following formulas are suggested (equations 1–2):

$$\text{msnovk}=\text{msnovk0}*\exp(\text{FNOXBAKT}*\text{delTemv})(\text{linearized: msnovk}=\text{msnovk0}*(1+\text{FNOXBAKT}*\text{delTemv})). \quad (1)$$

Here, msnovk0 corresponds to the NOx mass flow forward of the catalytic converter from the above-mentioned characteristic field and FNOXBAKT corresponds to a factor which represents the temperature-dependent NOx formation activation. For example: FNOXBAKT=0.003/Kelvin.

$$\text{delTemv}=\text{FT0\_TV} * (\text{Tein}-\text{TBEZUG})-\text{FTWASDA} * \text{antwasda}.\quad(2)$$

delTemv corresponds to a change of the combustion temperature because of inlet effects. Tein represents an inlet temperature quantity, combined from air temperature and engine temperature. TBEZUG corresponds to a temperature Tein at which the characteristic field was recorded. In the event that TBEZUG for the characteristic field is not constant, the formation of a mean value and, if needed, a recomputation of individual characteristic field points to this mean value takes place in advance of feeding the characteristic field into the engine control. FT0_TV represents an amplification factor for the effect of Tein changes on the combustion temperature. Example: FT0_TV=2.1. The quantity antwasda indicates the water vapor component of the intake air in volume percent (absolute). Here, it can be a measurement quantity. The factor FTWASDA indicates the influence of the vapor component on the combustion temperature. Suggestion: FTWASDA=26.6. The quantity Tans is the measured temperature of the intake air of the internal combustion engine and Tmotor is the measured engine oil temperature.

The numerical data are based on coarse estimates. These data are, from case to case, to be adapted to the conditions of a specific vehicle.

In stratified operation, one proceeds from the situation that the primary component of the NOx is formed in a local lambda range about the stoichiometric point (lambda =1) because here, the highest temperatures occur. One such region always occurs for stratified charge independently of the mean lambda. With the mean lambda, only its spatial expansion changes the effect of what is already considered in the characteristic field while the characteristic of the temperature dependency of the NOx formation remains essentially unchanged because of the allocation to the local region with lambda in the vicinity of 1. For this reason, FNOXBAKT should remain constant as a parameter in accordance with the input of data to the engine control for a specific engine in stratified operation (equation 1).

In homogeneous combustion, the local peak temperature is greatly dependent upon the air/fuel ratio which is characterized by the air number lambda. For this case, equation 1 is modified because of the temperature dependency of the activation factor (equation 1a).

$$\text{msnovk} =\text{msnovk0}*\exp(\text{FNOXBAKTL}*\text{lambda}**2* \text{delTemv}).(1a)$$

Here, FNOXBAKTL defines a factor for a lambda-dependent NOx formation activation. For example: FNOXBAKTL =0.003/K.

These formulas proceed from the characteristic field NOx mass flow msnovk0 and use the measurement quantities: intake air temperature Tans, engine oil temperature Tmotor and water vapor component antwasda for the modification of the read-out characteristic field values. The advantages of the available characteristic field are retained (equation 1) and are supplemented by a simply structured description of the influence of the mentioned measurement quantities. Characteristic for the method is the bundling of all measurement quantities in the ancillary quantity delTemv which serves as an index for the increase of the combustion peak temperature (equation 2). The water vapor component antwasda of the intake air acts as a heat sink and lowers, for a constant air ratio, the combustion temperature compared to dry air. For the case wherein one does not measure the water vapor component, the following consideration can make the explicit inclusion thereof unnecessary: the maximum absolute air moisture is strongly coupled to the air temperature in the intake air temperature field from −30° C. to +50° C. By selecting a mean relative humidity, it is achieved to reduce the problem to the adaptation of the remaining parameters. The deviation of a computed quantity "inlet temperature Tein " from the temperature TBEZUG is amplified by the factor FT0_TV (equation 2) in the course of compression and combustion. The effects of the intake temperature Tans and the engine temperature Tmotor are combined in the inlet temperature Tein and the characteristic field was recorded at the temperature TBEZUG.

Figure 2:
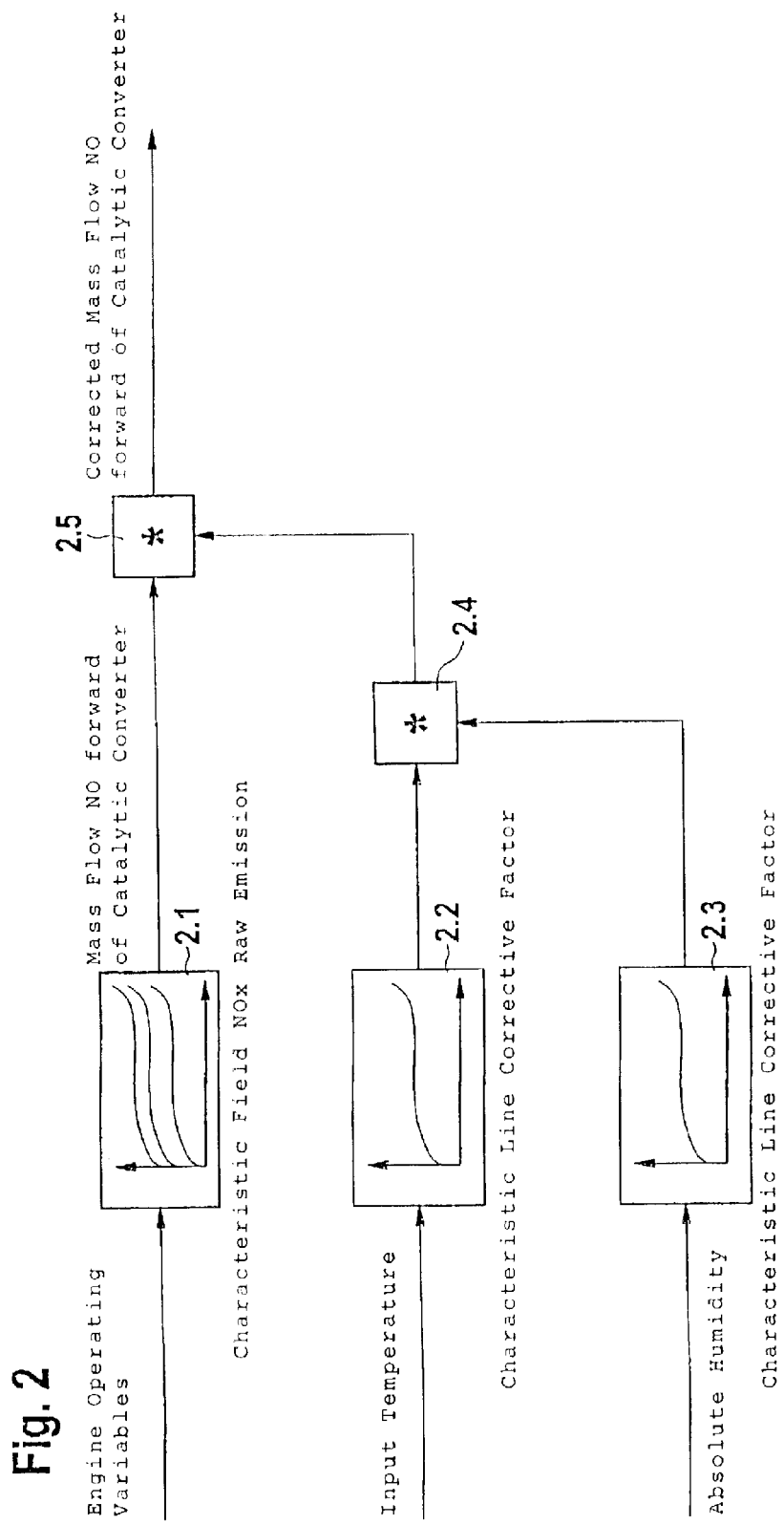
FIGS. 2 to 4 show embodiments of the invention in the context of function blocks.

Referring to FIG. 2, and as an alternative to the formulas (equations 1 and 2), the use of a characteristic field as to the input temperature Tein and the water vapor content of the intake air is considered for the factor for the multiplication by the NOx characteristic field data or the multiplication by two characteristic lines. One characteristic line is for Tein and a second characteristic line is for the water vapor content in the intake air. Block 2.1 represents a characteristic field which is addressed via engine operating variables such as load and rpm and which supplies a first value for the NOx mass flow ahead of the catalytic converter. The blocks 2.2 and 2.3 represent characteristic lines for corrections of the temperature influence (formed while using values for the engine oil temperature and intake air temperature) and of the influence of the water vapor content in the intake air (absolute humidity) which are logically coupled to each other in block 2.4 and logically coupled in a block 2.5 with the output value of the characteristic field 2.1.

Figure 3:
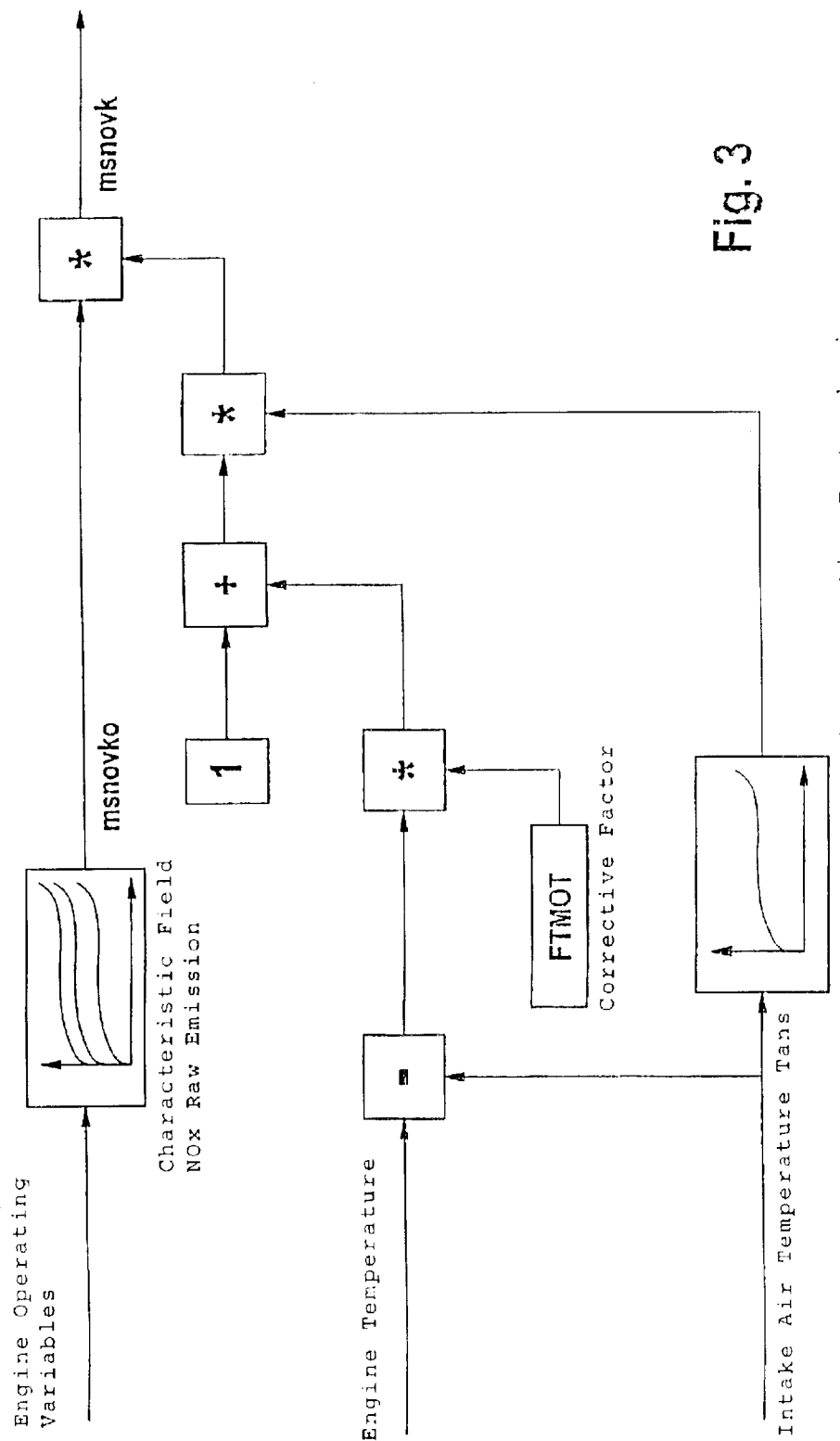

In FIG. 3, for the case that the water vapor content is not measured, one can use a characteristic line as to Tans (in the determination of which the relative humidity was assumed at a mean value of, for example, 0.5) and can consider the influence of the engine temperature (FIG. 3) with a simply structured factor (equation 3) for whose derivation the linearization capability of equation 1 is used.

$$msnovk=msnovk0*Kennlinie(Tans) * (1+FTMOT*(Tmotor-Tans))$$

Figure 4:
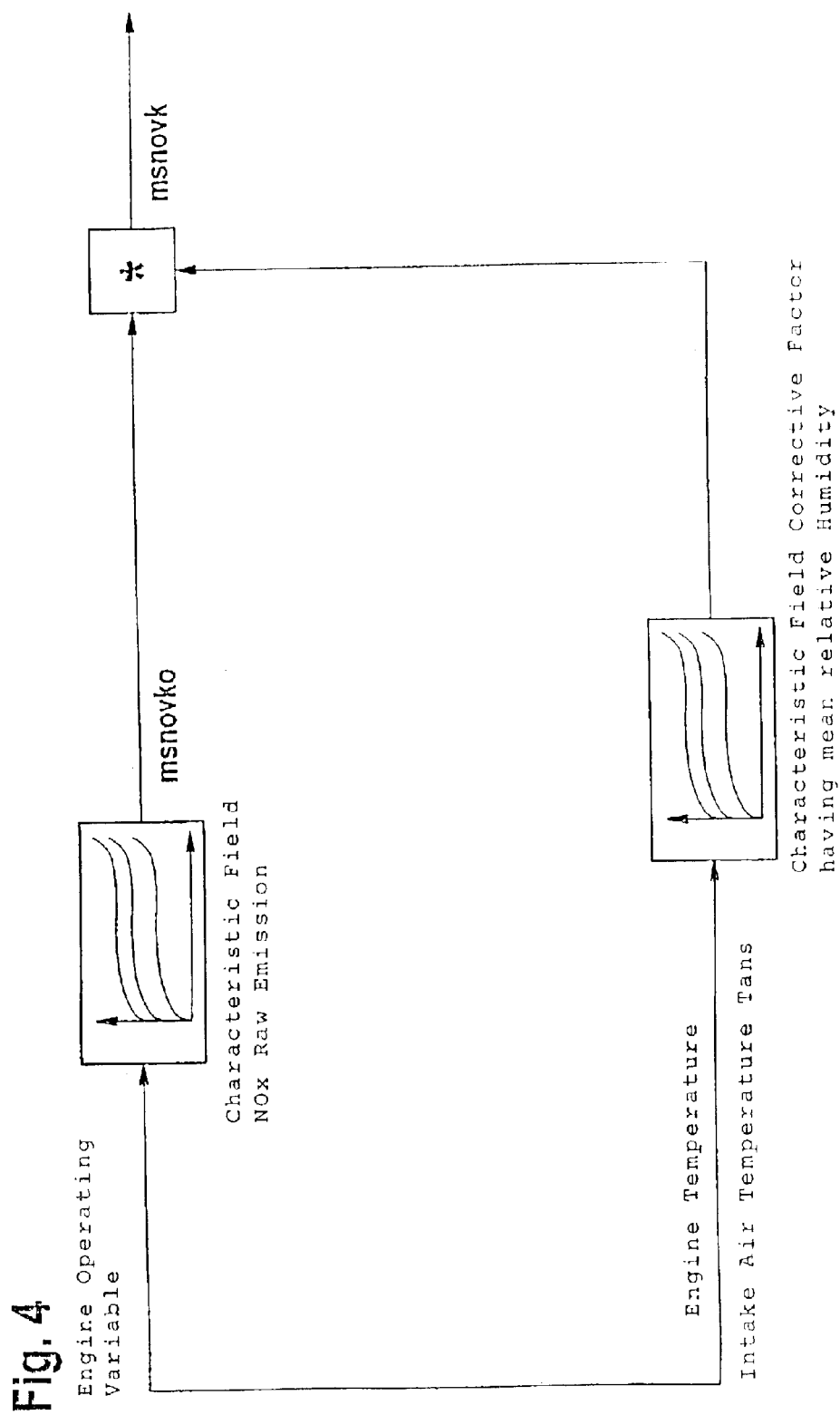

FIG. 3 shows a function block diagram of this computation. The use of a characteristic line as a function of Tein is not recommended here because the engine temperature has no influence on the air humidity effect. The factor FTMOT contains the proportional influence of the engine temperature on Tein, its amplification in the compression phase and a factor for the NOx formation activation FNOXBAKT (suggestion: FTMOT=0.001/K). FIG. 4 provides a summary of the influence quantities of FIG. 3 in a characteristic field.

An expansion of the present NOx emission characteristic field into two or three further dimensions is conceivable; however, this is not considered because of storage space problems and computation time problems.

What is claimed is:

1. A method for determining the NOx mass flow (msnovK) in the exhaust gas of an internal combustion engine at the input of a storage catalytic converter from operating parameters which include the intake air temperature and the engine temperature, the method comprising the steps of:

determining the water vapor component of the intake air from the temperature of the intake air, wherein said water vapor component is factored into the determination of the NOx mass flow (msnovK) in the exhaust gas of an internal combustion engine.

2. The method of claim 1, wherein the NOx mass flow (msnovk) forward of the catalytic converter is computed as a product of a temperature-independent base value (msnovk0) and a temperature-dependent factor (exp (FNOXBAKT*delTemv)).

3. The method of claim 2, wherein the temperature-dependent factor is proportional to a change (delTemv) of the combustion temperature as a consequence of changes of an inlet temperature quantity (Tein); and, the inlet temperature quantity (Tein) is combined from air temperature and engine temperature.

4. The method of claim 1, wherein the computation of the NOx mass flow forward of the catalytic converter takes place in stratified operation differently than in homogeneous operation for an internal combustion engine which can be operated in a first operating mode with a layered mixture distribution in the combustion chamber (stratified operation) and in a second operating mode with a homogeneous mixture distribution in the combustion chamber (homogeneous operation).

5. The method of claim 4, wherein, in homogeneous operation, additionally a factor is considered for a lambda-dependent NOx formation activation.

6. The method of claim 1, wherein an increasing water vapor component of the intake air operates in the computation to effect a reduction of the NOx mass flow forward of the catalytic converter.

7. An arrangement for determining the NOx mass flow (msnovK) in the exhaust gas of an internal combustion engine at the input of a storage catalytic converter from operating parameters which include the intake air temperature and the engine temperature, the arrangement comprising:

means for determining the water vapor component of the intake air from the temperature of the intake air; and, means for factoring the water vapor component of the intake air into the determination of the NOx mass flow (msnovK) in the exhaust gas of an internal combustion engine.

* * * * *